United States Patent [19]

Spencer et al.

[11] 4,286,577

[45] Sep. 1, 1981

[54] APPARATUS FOR CONTAINING LIQUID

[75] Inventors: Donald L. Spencer, Iowa City; Patrick J. Melroy, Wellman, both of Iowa

[73] Assignee: The University of Iowa Research Foundation, Iowa City, Iowa

[21] Appl. No.: 965,362

[22] Filed: Nov. 30, 1978

[51] Int. Cl.³ .............................................. F24H 7/00
[52] U.S. Cl. .................................... 126/429; 126/435
[58] Field of Search ............... 126/428, 429, 442, 435, 126/400; 62/436; 165/161

[56] References Cited

U.S. PATENT DOCUMENTS

| 1,583,255 | 5/1926 | Moore | 126/435 X |
|---|---|---|---|
| 2,969,637 | 1/1961 | Rowekamb | 126/442 X |
| 3,563,305 | 2/1971 | Hay | 126/429 X |
| 4,068,652 | 1/1978 | Worthington | 126/432 X |

Primary Examiner—Samuel Scott
Assistant Examiner—Theophil W. Streule, Jr.
Attorney, Agent, or Firm—Beveridge, DeGrandi, Kline & Lunsford

[57] ABSTRACT

Longitudinally spaced sections of a collapsible plastic tube are supported on vertically spaced support surfaces. The supported sections of the tube serve as liquid reservoirs, these reservoir sections being laterally supported at their outlet ends by an overflow support. When the depth of liquid exceeds the height of the overflow support, the liquid flows downwardly through an overflow section of the tube into the succeeding reservoir section. Air is heated or cooled by flowing it through spaces which are bounded by the reservoir sections. A solar collector has its inlet connected to the lowermost reservoir section, and its outlet connected to the uppermost reservoir section.

11 Claims, 4 Drawing Figures

APPARATUS FOR CONTAINING LIQUID

BACKGROUND OF THE INVENTION

This invention relates to liquid storage systems and heat exchange systems which, although suitable for a variety of purposes, are primarily designed for use in hot water storage sections of residential solar energy systems.

A major expense in residential solar heating systems is the apparatus for storing heat. A modest single family residence with a hot water storage system may require a 2000 gallon steel tank for short-term storage. This is often connected to a fan/coil heat exchanger which further increases cost of the system. Such systems are expensive if installed when the residence is under construction, and these costs escalate significantly when installation is made in existing structures requiring major excavational and structural work.

The present invention is intended to provide a cost effective system for storing and/or heating liquids in solar systems or other installations. The expense of the system is minimized by the design which permits use of relatively inexpensive materials. Installation is simplified and does not require highly skilled labor, structural work, major excavation work or the handling of large and heavy components. When constructed as a heat exchanger, the storage system of this invention also eliminates the need for a separate mechanical heat exchanger.

SUMMARY OF THE INVENTION

The apparatus of this invention, when considered broadly as a heat exchanger, includes a vertically spaced set of liquid containing reservoir sections, connected in series by liquid passages which extend downwardly from the outlet end of one reservoir section to the inlet end of a lower reservoir section. The upper surface of the liquid in each section supports a barrier layer, and a gaseous medium is flowed across the barrier layer to remove heat from or add heat to the liquid.

As a liquid storage apparatus, the invention includes a flexible tube which has liquid-containing reservoir sections supported on vertically spaced support surfaces. A liquid inlet is connected to the upper reservoir section, and a liquid outlet is connected to the lower reservoir section. Liquid flows downwardly from one reservoir section to another by overflow sections of the tube. Preferably the apparatus is connected to a solar collector which heats the circulating water, and air is heated or cooled by flowing it through a space above each reservoir section.

It is preferred to provide the outlet end of each overflow section with an overflow support which is above the supporting surface so that liquid does not flow into the succeeding reservoir section until its depth exceeds the height of the overflow support. The structure is formed primarily of manually liftable concrete blocks of L-shaped cross section, arranged to provide lateral support for the reservoir sections. The reservoir and overflow sections are preferably successive longitudinal sections of a single, continuous, collapsible layflat plastic tube.

THE DRAWINGS

BRIEF DESCRIPTION OF A PREFERRED EMBODIMENT

Figure 1:
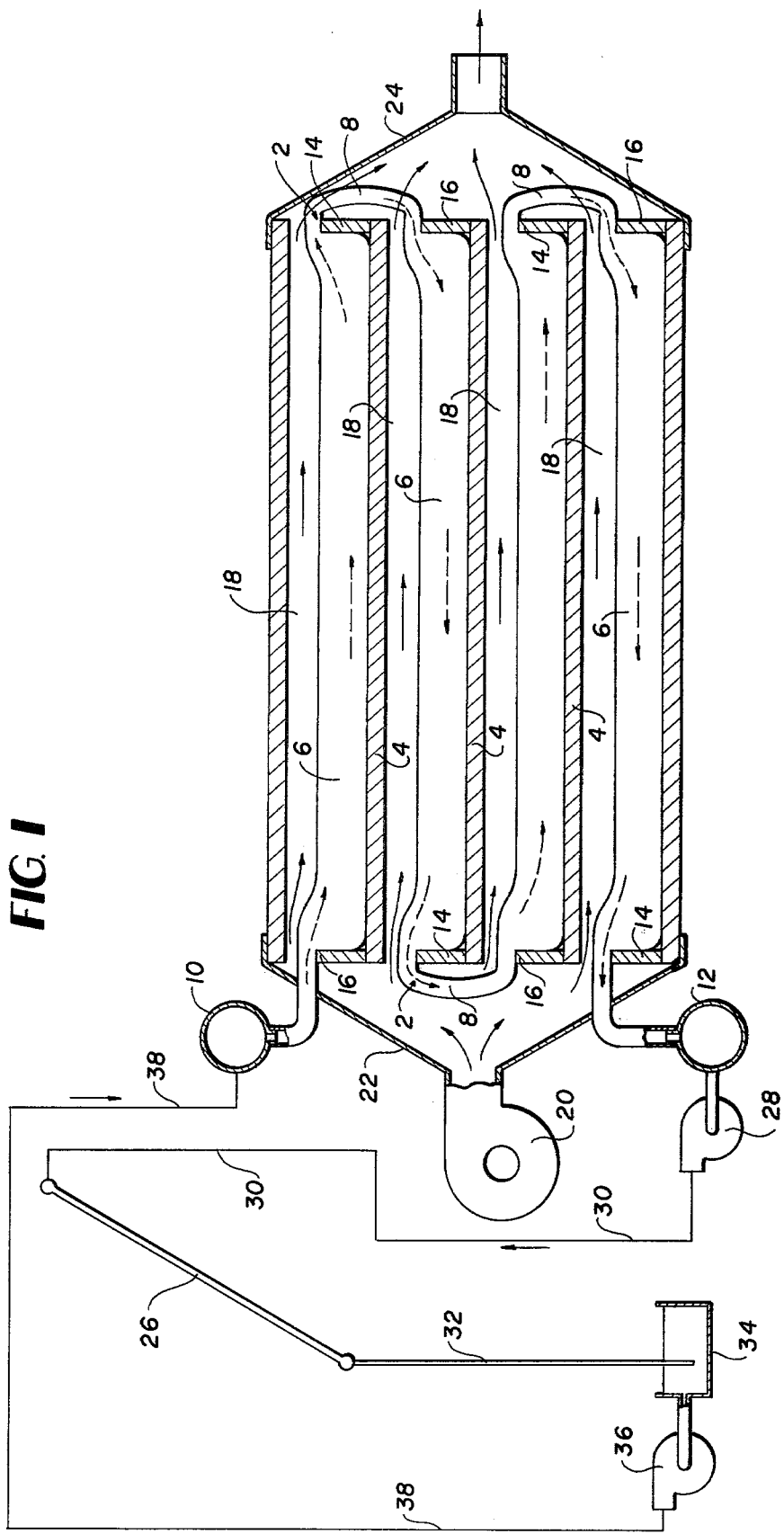
FIG. 1 is a diagrammatic view of a solar heating system which includes a water storage and heating system constructed in accordance with the invention.

The apparatus shown in FIG. 1 includes a single continuous layflat polyethylene plastic tube 2 laid in sinuous or zig-zag fashion on support members 4 which are vertically aligned and at different elevations. The water-containing reservoir of sections 6 of the tube are supported by members 4, and the downwardly extending overflow sections 8 of the tube 2 lead from one reservoir section 6 to the succeeding lower reservoir section. A liquid inlet header 10 is connected to the uppermost reservoir section 6, and a liquid outlet header 12 is connected to the overflow section 8 which extends from the lowermost reservoir section.

The reservoir sections 6 are laterally supported by sidewalls and end walls 14 and 16. The end walls 14 serve as overflow support members at the outlet ends of the reservoir sections. The height of walls 14 establish the depth of liquid in the reservoir sections 6, in that the reservoir section will not release water into the succeeding overflow section until the liquid depth reaches the upper edge of the wall 14.

The water in the reservoir section is heated or cooled by a fluid, preferably air, which is circulated through the open spaces 18 located above each reservoir section 6. If necessary, the overflow sections 8 of plastic tube 2 may be displaced laterally to facilitate air flow. Excessive humidification of the air or evaporation of the water is preferably deterred by the wall of tube 2 which lies in intimate conforming contact with the liquid surface and acts as a thermally conductive barrier in the reservoir section 6. Air is flowed through open spaces 18 by a blower 20 connected to an air inlet hood 22. Air leaving the spaces 18 is received by an outlet hood 24 and carried by ductwork to points of use such as the registers of a central heating and air conditioning system.

To reheat the liquid leaving the tube 2, FIG. 1 shows diagrammatically a solar heating system which has a collector with an absorber panel 26 exposed to solar radiation. A pump 28 pumps water from outlet header 12 through line 30 toward the upper inlet end of the absorber panel 26. The water flows downwardly through the absorber panel 26, preferably at a uniform negative pressure, and from the absorber panel outlet into a line 32. This line 32 carries the solar-heated water into a reservoir 34 which is at atmospheric pressure. A pump 36 feeds the heated water through line 38 to the inlet header 10 to complete the cycle. Liquid flowing from the inlet header 10 into the uppermost reservoir section will eventually cause the upper reservoir section to overflow, releasing some of its contents into the overflow section 8 into the next reservoir section 6. This continues successively through the system, it being assured that all reservoir sections are full, with the possible exception of the lowermost reservoir section which may be connected directly to the suction side of a pump rather than to an overflow section as shown.

It will be appreciated that the tube 2 is preferably flexible and collapsible. This will prevent any undesired siphon action in the system, since the overflow sections 8 will collapse and close when the water therein is at subatmospheric pressure.

Figure 2:
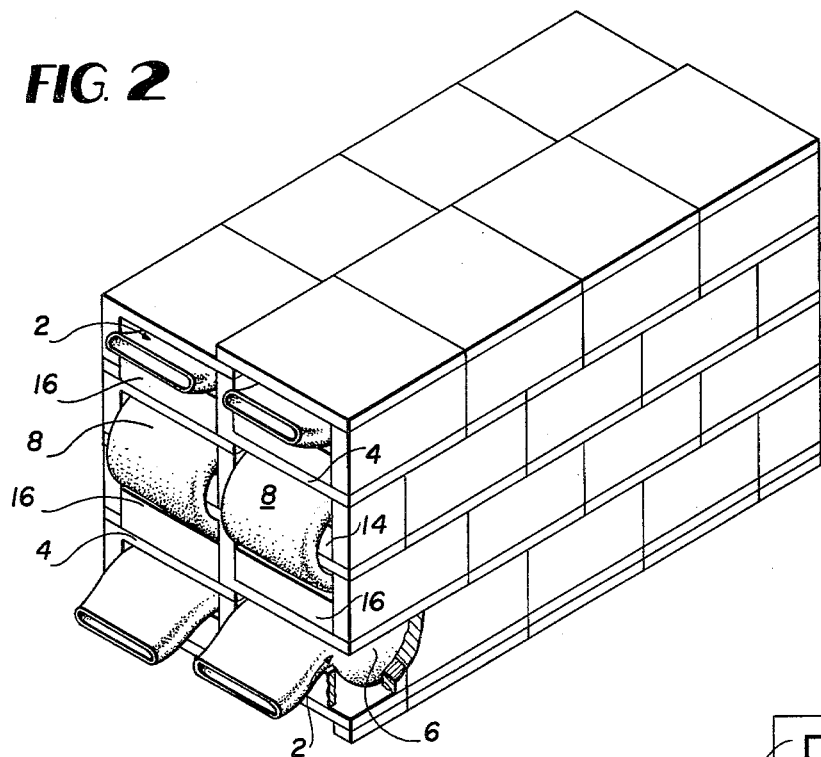
FIG. 2 is a perspective view of a dual liquid-containing system embodying the principles of the invention; and, FIG. 3 is a transverse sectional view of the structure of FIG. 2.
Figure 4:
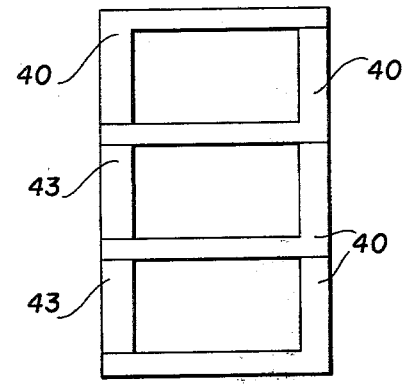
FIG. 4 is a transverse sectional view of a modified support structure which is suitable for use in practicing the invention.
Figure 3:
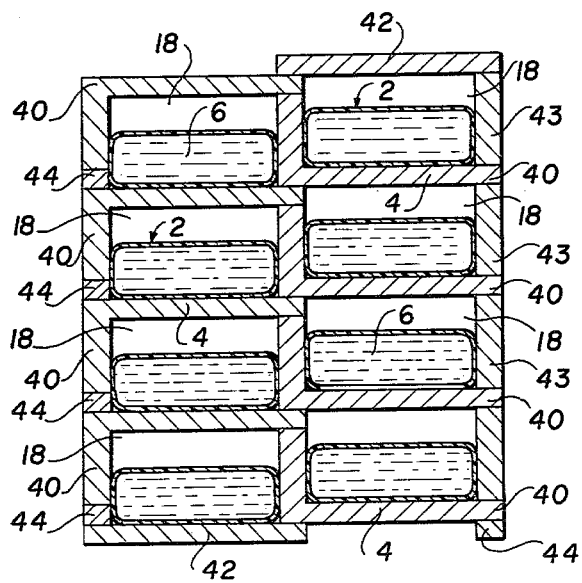

FIGS. 2-4 show the preferred structures for providing the horizontal and lateral support surfaces for the apparatus. FIGS. 2 and 3 show adjacent side-by-side parallel systems in which the primary building components are modules 40 of L-shaped cross-section. There are also flat modules 42, sidewall modules 43, spacer modules 44 and modules which form the end walls 14 and 16. The modules are small enough so they can be carried through doorways and down stairways to a basement or other installation site, thereby avoiding any excavation or major structural work on a building where the system is installed. The modules are stacked as shown, using mortar joints if desired. The tube 2 is laid in place and the air and water connections are made as shown in FIG. 1 to complete the unit.

FIG. 4 shows a single unit having three tiers formed of four L-shaped modules 40 and two sidewall modules 43. This unit receives and supports a continuous length of plastic tubing, substantially in the same manner as shown in FIG. 1.

Persons acquainted with the field of the invention will realize that the invention may be practiced by a variety of systems which differ from the illustrated preferred embodiment. Accordingly, it is emphasized that the invention is not limited to the foregoing exemplary embodiments, but is embracing of a diversity of structures which fall within the spirit of the following claims.

We claim:

1. Apparatus for containing, storing and providing heat exchange with a body of liquid comprising,
   a continuous tube which includes a plurality of vertically spaced reservoir sections for containing quantities of a primary liquid to be heated or cooled, each said reservoir section having at its opposite ends an inlet end and an outlet end,
   liquid passages connecting said reservoir sections and extending downwardly from the outlet end of each reservoir section to the inlet end of a lower said reservoir section,
   an overflow member at the upper end of each of said liquid passages for releasing liquid which exceeds the height of said overflow member into the liquid passage,
   barrier means in intimate contact with and conformable to the upper surface of liquid in each of said reservoir sections, and,
   means for flowing a gaseous medium laterally across said barrier means to remove heat from or add heat to the liquid in said reservoir sections.

2. The apparatus of claim 1 wherein the barrier means is a plastic film.

3. Apparatus for containing, storing and providing heat exchange with a body of liquid comprising,
   a plurality of support members having supporting surfaces disposed at different elevations,
   a continuous flexible tube having spaced longitudinal reservoir sections which lie on said plurality of support members,
   said reservoir sections being connected together by vertical overflow sections which extend downwardly from one reservoir section to a said reservoir section therebelow,
   an upper one of said reservoir sections having a liquid inlet means, and a lower one of said reservoir sections having a liquid outlet means,
   an overflow support member at the upper end of each of said vertical overflow sections, said overflow support member being located at an elevation which is higher than its respective supporting surface so the reservoir section does not release liquid until the depth of liquid therein exceeds the height of said overflow support member,
   each of said reservoir sections having an open space thereabove, and means for flowing air through said open space in heat exchange relation to the liquid contained in the reservoir sections.

4. The apparatus of claim 3 wherein said support member includes lateral support means for laterally supporting said reservoir sections when filled with liquid.

5. The apparatus of claim 3 wherein said support members are vertically aligned with each other.

6. The apparatus of claim 3 wherein the support members and lateral supports are formed of rigid modules of L-shaped cross section.

7. The apparatus of claim 3 including a solar collector means for heating a liquid, said solar collector means having a collector inlet connected to said liquid outlet means and a collector outlet connected to said liquid inlet means.

8. Apparatus for collecting solar energy, storing the collected energy and providing heat exchange of the stored energy, comprising,
   a solar collector means for heating a liquid, said solar collector means having a collector inlet and a collector outlet,
   a plurality of support members having supporting surfaces disposed at different elevations,
   a continuous flexible tube having spaced longitudinal reservoir sections thereof lying on said plurality of support members, said spaced longitudinal reservoir sections being connected together by vertical overflow sections which extend downwardly from one reservoir section to a said reservoir section therebelow,
   means connecting an upper one of said reservoir sections to the liquid outlet means of the solar collector means,
   means connecting a lower one of said reservoir sections to said liquid inlet means of the solar collector means,
   an overflow support member at the upper end of each of said vertical overflow sections, said overflow support member being located at an elevation which is higher than its respective supporting surface so the reservoir section does not release liquid until the depth of liquid therein exceeds the height of said overflow support member,
   each of said reservoir means having an open space thereabove, and means for flowing air through said open space in heat exchange relation to the reservoir sections and the liquid contained therein.

9. The apparatus of claim 8 wherein said support members are vertically aligned with each other.

10. The apparatus of claim 8 wherein said reservoir sections and said overflow sections are successive longitudinal sections of a single continuous layflat plastic tube.

11. The apparatus of claim 8 wherein the support members and lateral supports are formed of rigid modules of L-shaped cross section.

* * * * *